United States Patent
Bespalov

(10) Patent No.: US 8,190,368 B2
(45) Date of Patent: May 29, 2012

(54) METHOD OF FINITE-ELEMENT DISCRETIZATION IN HETEROGENEOUS AND HIGHLY CONDUCTIVE GRID CELLS

(75) Inventor: Alexandre N. Bespalov, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 639 days.

(21) Appl. No.: 12/336,584

(22) Filed: Dec. 17, 2008

(65) Prior Publication Data

US 2009/0254282 A1    Oct. 8, 2009

Related U.S. Application Data

(60) Provisional application No. 61/043,057, filed on Apr. 7, 2008.

(51) Int. Cl.
*G01V 1/40* (2006.01)
(52) U.S. Cl. .......... 702/7; 702/11; 702/66; 702/94; 702/150; 702/189
(58) Field of Classification Search ............... 703/2, 23; 702/7, 11, 66, 94, 150, 189; 367/14, 13, 367/81; 324/347, 600; 73/152.18
See application file for complete search history.

(56) References Cited

U.S. PATENT DOCUMENTS

| | | | |
|---|---|---|---|
| 5,883,515 A * | 3/1999 | Strack et al. | 324/339 |
| 7,027,922 B2 * | 4/2006 | Bespalov et al. | 702/7 |
| 7,620,536 B2 * | 11/2009 | Chow | 703/13 |
| 7,894,989 B2 * | 2/2011 | Srnka et al. | 702/2 |
| 2006/0015306 A1 | 1/2006 | Chow | |

OTHER PUBLICATIONS

Bespalov, Alexander (Baker Hughes), FEMAX-software for simulation of magnetic induction tools in vertical wells. SEG-02 Technical Program Expanded Abstracts, 2002, vol. 21, pp. 708-711.
Bespalov, Alexander (Baker Hughes), Simulation of electromagnetic well-logging tools by the Nedelec edge finite elements. Seg-07 Technical Program Expanded Abstracts, 2007, vol. 26. pp. 673-677.
Davydycheva, Sofia; Druskin, Vladimir; Habashy, Tarek (Schlumberger), An efficient finite-difference scheme for electromagnetic logging in 3D anisotropic inhomogeneous media. Geophysics, 2003, vol. 68, No. 5, pp. 1525-1536.

* cited by examiner

*Primary Examiner* — Mohammed Charioui
*Assistant Examiner* — Elias Desta
(74) *Attorney, Agent, or Firm* — Cantor Colburn LLP

(57) ABSTRACT

A method for simulating a conductivity measured by a resistivity tool disposed in a borehole penetrating a formation, the method including: constructing a main grid extending from the borehole into the formation; constructing an auxiliary grid that is local to the main grid and fitted to a boundary between a first region having a first conductivity and a second region having a second conductivity; discretizing a problem operator on the auxiliary grid applying Maxwell's Equations to a volume represented by the auxiliary local grid, the Maxwell's Equations including a term representing the conductivity of a material in the volume; calculating one-dimensional functions for points on the auxiliary grid; constructing basic functions from the calculated functions; discretizing by the basic functions for points on the main grid; solving the resulting set of equations to obtain the simulated measured conductivity for the resistivity tool; and providing the simulated measured conductivity as output.

18 Claims, 7 Drawing Sheets

METHOD OF FINITE-ELEMENT DISCRETIZATION IN HETEROGENEOUS AND HIGHLY CONDUCTIVE GRID CELLS

CROSS REFERENCE TO RELATED APPLICATIONS

This application is filed under 37 CFR §1.53(b) and claims priority under 35 U.S.C. §119(e) to U.S. Provisional Patent Application No. 61/043,057, entitled "Method of Finite Element Discretization in Heterogeneous and Highly Conductive Grid Cells," filed Apr. 7, 2008, which is incorporated herein by reference in its entirety.

BACKGROUND OF THE INVENTION

1. Field of the Invention

The invention disclosed herein relates to analysis of resistivity data collected in geophysical exploration and, in particular, to techniques for improved speed and precision of numerical simulations.

2. Description of the Related Art

Exploration for oil, gas and other hydrocarbons uses a variety of technologies embodied in various tooling and instrumentation. One important technology makes use of resistivity measurements. In resistivity measurements, an electric current is directed into formations surrounding a wellbore and various measurements are performed. Data collected from measurements is then interpreted in a variety of ways. Techniques include use of data inversion and simulation.

Data inversion is used to determine a property of an earth formation from the data collected by the resistivity measurements. To generate a data inversion algorithm, a simulation of a resistivity tool is used to estimate the data that would be obtained from the tool using known properties of the formation. Both data inversion and simulation require an accurate and precise method of simulating measurements performed by the resistivity tool.

It is known that in existing methods, (such as for two-dimensional electromagnetic simulation, as may be used in studies and data inversion), simulation precision deteriorates when a grid cell is one of heterogeneous or filled with a highly conductive material (such as metal), so that its size is much greater than the skin depth.

Thus, what are needed are techniques for overcoming drawbacks of the classical "parallel-serial" way of material averaging (inside a heterogeneous discretization cell), both by theoretical analysis and numerical experiments. Preferably, the technique provides precise numerical results over existing solutions. Among other things, the techniques should enable accurate simulation of problems with thin skin layers on coarse grids.

BRIEF SUMMARY OF THE INVENTION

Disclosed is a method for simulating a conductivity measured by a resistivity tool disposed in a borehole penetrating an earth formation, the method including: constructing a main grid extending from the borehole into the formation; constructing an auxiliary grid that is local to the main grid and fitted to a boundary between a first region having a first conductivity and a second region having a second conductivity; discretizing a problem operator on the auxiliary grid wherein the problem operator applies Maxwell's Equations to a volume represented by the auxiliary local grid and the Maxwell's Equations include a term representing the conductivity of a material in the volume; calculating one-dimensional functions for points on the auxiliary grid; using the one-dimensional functions for construction of basic functions on the main grid; discretizing by the basic functions for points on the main grid; solving the resulting set of equations to obtain the simulated measured conductivity for the resistivity tool; and providing the simulated measured conductivity as output.

Also disclosed is a method for estimating a property of an formation penetrated by a borehole, the method including: conveying a logging tool in the borehole; performing resistivity measurements with the logging tool; simulating resistivity measurements performed by the logging tool by implementing the following steps: constructing a main grid extending from the borehole into the formation; constructing an auxiliary grid that is local to the main grid and fitted to a boundary between a first region having a first conductivity and a second region having a second conductivity; discretizing a problem operator denoted as $A_{i+1/2}{}^h$ on the auxiliary grid wherein the problem operator applies Maxwell's Equations to a volume represented by the auxiliary local grid and the Maxwell's Equations include a term representing the conductivity of a material in the volume; calculating one-dimensional functions $V_i(r)$ and $V_{i+1}(r)$ for points r on the auxiliary grid such that $$A_{i+1/2}{}^h V_i(r)=0, V_i(r_i)=1, V_i(r_{i+1})=0;$$

$$A_{i+1/2}{}^h V_{i+1}(r)=0, V_{i+1}(r_i)=0, V_{i+1}(r_{i+1})=1;$$

discretizing by basic functions $F_{i,j}{}^\Phi = V_i(r)L_j(z)$ for points r and z on the main grid, where $L_j(z)$ is a one dimensional continuous and piecewise linear function such that $L_j(z)=1$ at a grid node $z_j$ and $L_j(z)=0$ at all other grid nodes; solving the resulting set of equations to obtain the simulated measured conductivity for the resistivity tool; comparing the resistivity measurements to the simulated measurements; and estimating the property from the comparing.

Further disclosed is a machine-readable medium having machine-executable instructions for simulating a conductivity measured by a resistivity tool disposed in a borehole penetrating an earth formation, the instructions including the following steps: constructing a main grid extending from the borehole into the formation; constructing an auxiliary grid that is local to the main grid and fitted to a boundary between a first region having a first conductivity and a second region having a second conductivity; discretizing a problem operator denoted as $A_{i+1/2}{}^h$ on the auxiliary grid wherein the problem operator applies Maxwell's Equations to a volume represented by the auxiliary local grid and the Maxwell's Equations include a term representing the conductivity of a material in the volume; calculating one-dimensional functions $V_i(r)$ and $V_{i+1}(r)$ for points r on the auxiliary grid such that $$A_{i+1/2}{}^h V_i(r)=0, V_i(r_i)=1, V_i(r_{i+1})=0;$$

$$A_{i+1/2}{}^h V_{i+1}(r)=0, V_{i+1}(r_i)=0, V_{i+1}(r_{i+1})=1;$$

discretizing by basic functions $F_{i,j}{}^\Phi = V_i(r)L_j(z)$ for points r and z on the main grid, where $L_j(z)$ is a one dimensional continuous and piecewise linear function such that $L_j(z)=1$ at a grid node $z_j$ and $L_j(z)=0$ at all other grid nodes; and solving the resulting set of equations to obtain the simulated measured conductivity for the resistivity tool.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

One instrument for making resistivity measurements is available from Baker Hughes, Incorporated of Houston, Tex. The instrument, referred to as an "Earth Imager," has provided for a variety of resistivity images.

Figure 1:
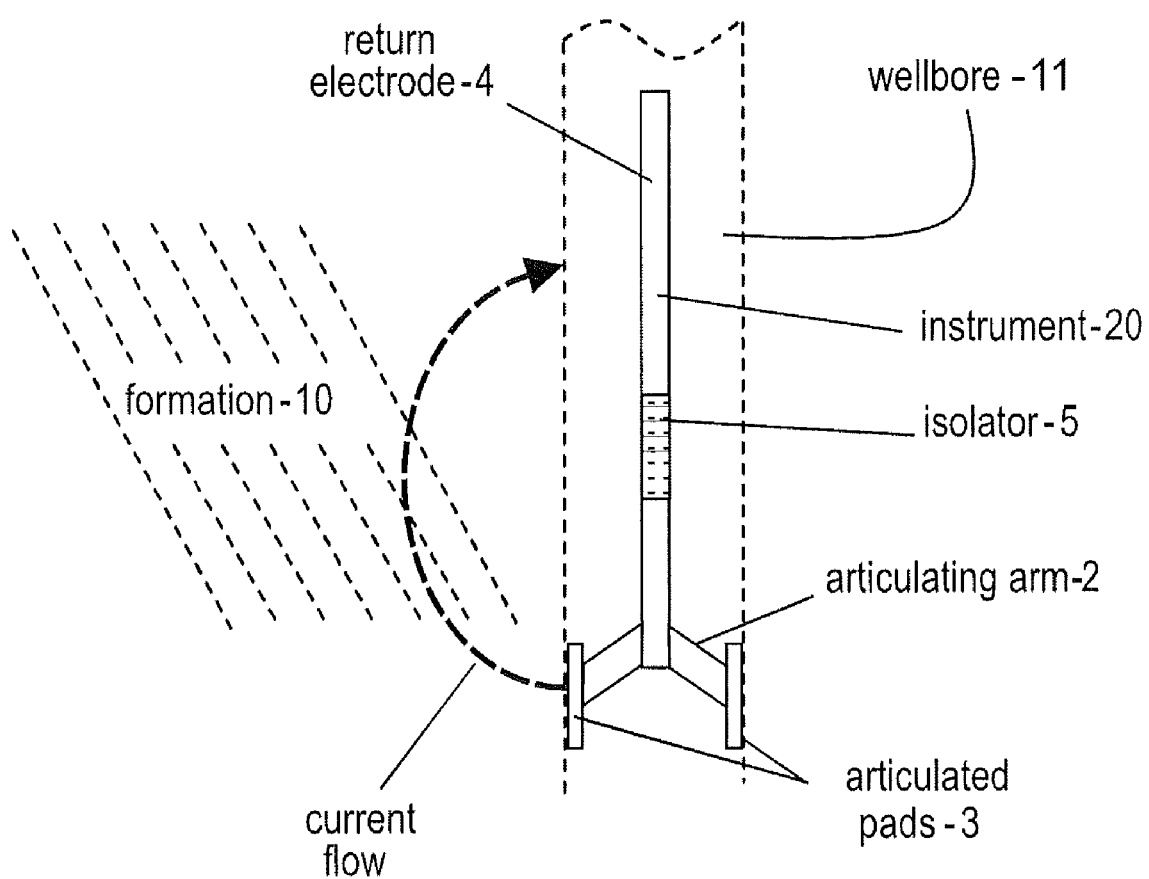
FIG. 1 depicts an instrument for making resistivity measurements.

Reference may be had to FIG. 1. In FIG. 1, there is shown a depiction of the instrument for performing resistivity imaging. In this example, the instrument (resistivity tool) 20 is disposed within a wellbore 11. The instrument 20 includes pads 3 mounted on articulating arms 2. The articulated pads 3 are typically pressed up against a wall of the wellbore (borehole) 11 and make firm contact therewith. Current, I, flows from the return electrode 4 to the pads 3. The return electrode 4 is electrically separated from each of the pads 3 by an isolator 5 (i.e., an insulating material). Usually, the wellbore 11 is at least partially filled with a mixture of liquids including water, drilling fluid, mud, oil and formation fluids that are indigenous to the formations 10 penetrated by the wellbore 11. Drilling mud may also be introduced into the wellbore 11. In typical embodiments, the drilling mud is a non-conductive or conductive fluid as is known in the art.

Figure 2:
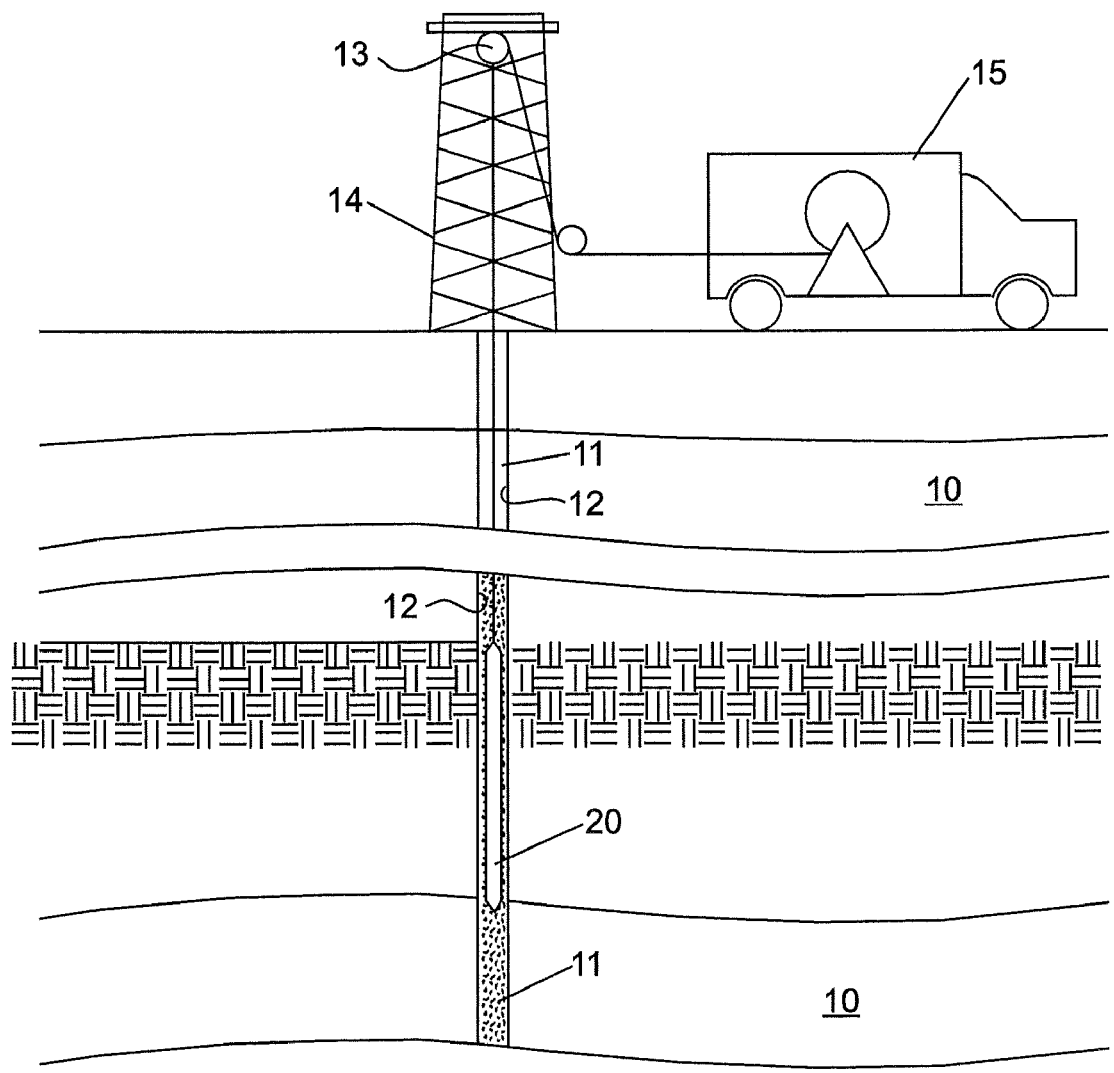
FIG. 2 depicts aspects of well logging using the instrument.

Turning now to FIG. 2, further aspects of logging a well using the instrument 20 are depicted. In FIG. 2, the instrument 20 is shown as suspended within the wellbore 11 at the bottom end of a wireline 12. The wireline 12 is often carried over a pulley 13 supported by a derrick 14. Wireline 12 deployment and retrieval is typically performed by a powered winch carried by a service truck 15. Alternatively, the instrument 20 may be conveyed in the wellbore 11 by slickline, coiled tubing, or a drill string in logging-while-drilling (LWD) applications.

As is known in the art, at least one of the imaging instrument 20 and the service truck 15 include electronics and support equipment as is needed for operating the imaging instrument 20. Included with the electronics and support equipment may be a power supply for providing power to the imaging instrument 20, processing capabilities, data storage, memory and other such components. The power provided to the imaging instrument 20 may be delivered over a broad range of frequencies, f, and currents, I.

In some embodiments, the power supply for the instrument 20 provides alternating current (AC) that is in a relatively high frequency, f, range (for example, of about 1 MHz to about 10 MHz). However, the instrument 20 may be operated at frequencies above or below this range. For example, the instrument 20 may be operated in ranges from about 100 kHz to 100 MHz. Alternatively, the instrument 20 may be used with direct current (DC) if desired.

As known to those skilled in the art of resistivity imaging, there are two major classes of instruments. In a first class, "induction" instruments generally provide primary excitation by a magnetic field generated by an induction transmitter. The induction transmitter transmits electromagnetic energy into a formation. The electromagnetic energy induces circulating currents in the formation. The magnitudes of the currents are related to conductivities of the formation. The currents in turn induce secondary electromagnetic energy in a receiver at the induction instrument. The magnitude of the secondary electromagnetic energy is related to the conductivities. Thus, by measuring the magnitude of the induced secondary electromagnetic energy, the conductivities can be determined. The second class, "galvanic" instruments use a set of electrodes or electrical dipoles to generate an electrical field due to a potential between them and thus drive currents into the materials surrounding the instrument. The amount of driven current is measured and related to conductivities of the materials.

Signal measurement may include known techniques for analog signal processing and digital signal processing as appropriate. As these and other aspects are known in the art, such aspects are generally not discussed in greater detail herein. It is noted here that the term "conductivity" may be used in place of resistivity recognizing that conductivity is the inverse of resistivity.

With regard to the prior art, numerical solution of a differential problem by finite-difference or finite-element methods requires discretization, (i.e. division of a computational domain into elementary cells (also referred to as "grid generation")) with succeeding construction of a corresponding approximate discrete problem. In the majority of practical cases, a discretized problem has discontinuous coefficients. That is, solution to the problem is disrupted on interfaces between subdomains. It is well known that the best precision is achieved when all these interfaces are fitted by the grid. But it is often impossible for different reasons. For example, the problem may be technically undoable, or lead to an excess quantity of unknown variables.

Thus, users of prior art techniques are provided with a problem of correcting approximations in a heterogeneous grid cell, for example, one that is intersected by at least one interface. Prior art attempts to address this problem make use of "material averaging" in such cells. That is, the prior art calls for replacing true varying coefficients by a constant effective tensor derived with a "parallel-serial" rule. It is demonstrated here, by theoretical analysis and numerical experiments, that this approach is inadequate, at least in some cases.

Accordingly, a new approach, which is applicable to two-dimensional (2D) simulation with "pancake" earth models is disclosed herein. The teachings provide special basic functions of the finite-element method. The functions are provided in such a way that they are conformal with varying problem coefficients in a heterogeneous cell. To do this, an auxiliary local discretization of the second level is used, with a grid fitted to all inner interfaces.

Advantageously, the technique also provides users with adequate resolution of thin skin layers on coarse grids. To achieve this, the auxiliary grid just needs to be chosen fine enough, (e.g., with a stepsize governed by the skin depth).

In order to provide some context, first consider that simulation in the frequency domain of measurements from induction resistivity tools and galvanic resistivity tools, calls for solving (three-dimensional, or 3D) Maxwell's equations, in the "electric" formulation:

$$\nabla \times ((i\omega\mu)^{-1}\nabla \times E) - \tilde{\sigma}E = J^{out}$$

or (equivalently) in the "magnetic" one:

$$\nabla \times (\tilde{\sigma}^{-1}\nabla \times H) - i\omega\mu E = \nabla \times (\tilde{\sigma}^{-1}J^{out}).$$

Here E and H represent an electric field and a magnetic field (complex-valued) respectively, $\omega$ represents an angular frequency, $\tilde{\sigma} = \sigma - i\omega\epsilon$ represents a generalized conductivity tensor, $\mu$ represents a magnetic permeability tensor, and $J^{out}$ represents an exciting electrical current.

For the sake of the finite element discretization, these differential problems are transformed into integral (Galerkin) forms by multiplying both sides on an arbitrary (but smooth enough) vector function F, integrating over the whole space, and applying the Green's formula:

$$\int_{R^3} ((i\omega\mu)^{-1}\nabla \times E \cdot \nabla \times F - \tilde{\sigma}E \cdot F)d\Omega = \int_{R^3} J^{out} \cdot F d\Omega \qquad (1)$$

for any F
or, correspondingly, $$\int_{R^3} (\tilde{\sigma}^{-1}\nabla \times H \cdot \nabla \times F - i\omega\mu H \cdot F)d\Omega = \qquad (2)$$

$$\int_{R^3} \tilde{\sigma}^{-1} J^{out} \cdot \nabla \times F d\Omega \text{ for any } F.$$

A finite element discretization technique is now presented. Let us search an approximate solution $E^h$ of (1) as:

$$E^h = \sum_{i=1}^{N} u_i F_i^h \qquad (3)$$

where $F_i^h$ are some basic functions.
Substituting (5) into (3) and requiring the equality to be satisfied for the basic functions $F_i^h$, $i=1, \ldots, N$, only, we get a system of linear equations for the coefficients $u_i$:

$$Au = f, \text{ where } u = (u_1, \ldots, u_N), \qquad (4)$$

$$f = (f_1, \ldots, f_N), A = \{a_{ij}\},$$

$$a_{ij} = \int_{R^3} ((i\omega\mu)^{-1}\nabla \times F_i^h \cdot \nabla \times F_j^h - \tilde{\sigma}F_i^h \cdot F_j^h)d\Omega,$$

$$f_i = \int_{R^3} J^{out} \cdot F_i^h d\Omega.$$

Integral formulation (2) is discretized analogously.

Now, let us assume that a tool is placed into an axially symmetric earth model (see FIG. 3)—i.e. none of the electric parameters depends on the azimuth $\phi$, and a source is axially symmetric as well. In this case the azimuthal dependence of a solution is known apriori:
$E(r,\phi,z) = E(r,z)\exp(ik\phi)$, $H(r,\phi,z) = H(r,z)\exp(ik\phi)$, so the problem becomes two-dimensional. In the majority of cases, we have k=0 (laterolog galvanic tools; induction tools with a longitudinal transmitter), but sometimes k=1 (induction tools with a transversal transmitter). Hereafter the case k=0 is considered only.

If a tool is induction excited by a longitudinal magnetic dipole then the electric formulation is used, where the azimuthal component $E_\phi$ is non-zero only. If a tool is galvanic excited by a longitudinal electric dipole then the magnetic formulation is used, where also the azimuthal component $H_\phi$ is non-zero only.

In the 2D case with k=0, the 3D basic functions (3) are reduced to the following construction. We build a grid:

$$(r_i, z_j), i=0, 1, \ldots, n_r, j=1, \ldots, n_z; r_0=0. \qquad (5)$$

Then we define auxiliary one-dimensional function $L_i(x)$ where x is any of the gridded space directions from (5). Function $L_i(x)$ equals 1 at a grid node $x_i$, 0 at all other nodes, and it is continuous and piecewise linear.

The basic functions for the azimuthal field component are defined as follows (using the double numeration as in (5)):

$$F_{i,j}^\phi = \frac{r_i}{r} L_i(r) L_j(z) \text{ for } r \geq r_1; \qquad (6)$$

$$F_{i,j}^\phi = L_i(r) L_j(z) \text{ for } r \leq r_1.$$

Figure 3:
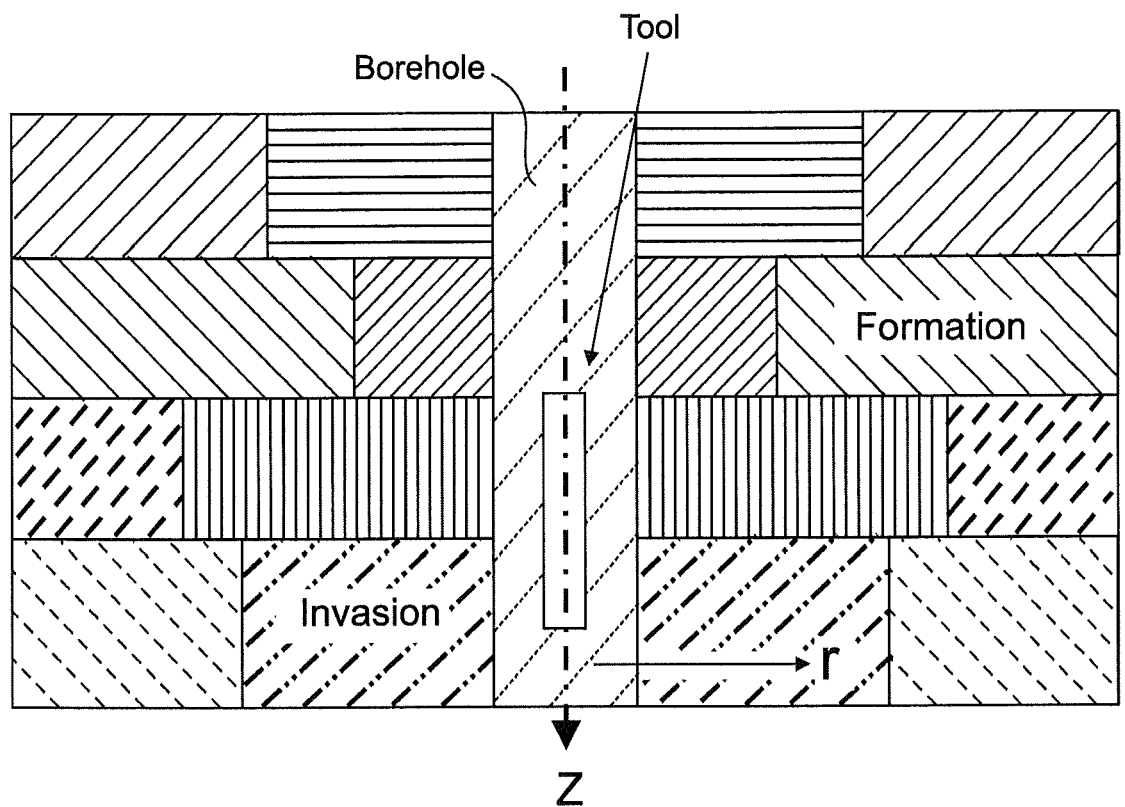
FIG. 3 illustrates an axially symmetric earth model.

Let us further assume that the earth model consists of $N_L$ horizontal layers, and inside each layer, electric parameters do not depend on z (as in FIG. 3). This model is often used for data interpretation. Algebraic solver FEMAX may be used to solve this system of equations. Its arithmetic expenses are estimated as $$\sim N_L n_r^3 \ln(n_z N_L^{-1}). \qquad (7)$$

A classical material averaging technique is now presented. The best precision of the simulation for the considered 2D model is achieved when all horizontal and vertical boundaries are fitted by the grid (5) (i.e. their positions are grid nodes). It is affordable for the horizontal ones (so it is always done in FEMAX), but, in many cases, it is not so for vertical boundaries. Namely, when there are a lot of layers each having its own vertical interfaces, an attempt to fit all of them leads to great increase of $n_r$ and, thus, to unacceptable arithmetic expenses (see the cubic dependence in estimate (7)).

Thus, some of grid cells in some layers can be intersected by interfaces between radial zones, and the problem of correct approximation in them appears. Consider first the classical "parallel-serial" material averaging. Let an inner interface $\hat{r}$ be inside a radial step $(r_i, r_{i+1}, r_i < \hat{r} < r_{i+1}$, so that the generalized conductivity is:

$$\tilde{\sigma}(r) = \tilde{\sigma}_1 \text{ for } r_i < r < \hat{r}; \tilde{\sigma}(r) = \tilde{\sigma}_2 \text{ for } \hat{r} < r < r_{i+1}$$

Figure 4A:
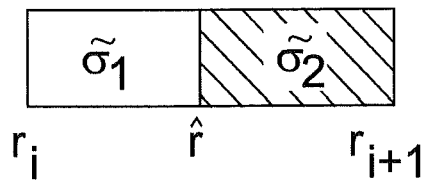
FIGS. 4A and 4B, collectively referred to as FIG. 4, depict aspects of a heterogeneous grid cell.

(see FIG. 4A). The classical rule consists in replacement of this varying coefficient by the constant tensor:

$$\hat{\sigma} = \begin{bmatrix} \tilde{\sigma}_r & 0 & 0 \\ 0 & \tilde{\sigma}_\phi & 0 \\ 0 & 0 & \tilde{\sigma}_z \end{bmatrix}$$

where each cylindrical component is derived from the assumption that the electric current is either fully radial, or fully azimuthal, or fully vertical. So far the current has to be divergent-free:

$$\nabla \cdot J = r^{-1}\frac{\partial(rJ_r)}{\partial r} + r^{-1}\frac{\partial J_\phi}{\partial \phi} + \frac{\partial J_z}{\partial z} = 0,$$

its components are taken as:

$$J_r = \text{const} \cdot r^{-1}; J_\phi = \text{const}; J_z = \text{const};$$

which leads to the following formulas:

$$\hat{\sigma}_r = \frac{r_i^{-1} - r_{i+1}^{-1}}{\tilde{\sigma}_1^{-1}(r_i^{-1} - \hat{r}^{-1}) + \tilde{\sigma}_2^{-1}(\hat{r}^{-1} - r_{i+1}^{-1})}, \quad (8)$$

$$\hat{\sigma}_\phi = \frac{\tilde{\sigma}_1 \ln\frac{\hat{r}}{r_i} + \tilde{\sigma}_2 \ln\frac{r_{i+1}}{\hat{r}}}{\ln\frac{r_{i+1}}{r_i}},$$

$$\hat{\sigma}_z = \frac{\tilde{\sigma}_1(\hat{r}^2 - r_i^2) + \tilde{\sigma}_2(r_{i+1}^2 - \hat{r}^2)}{r_{i+1}^2 - r_i^2}.$$

This averaging is easily generalized for a case of several interfaces. Formulas (8) are not defined at the first radial step (where $r_i = r_0 = 0$), so no averaging is done there.

Figure 4B:
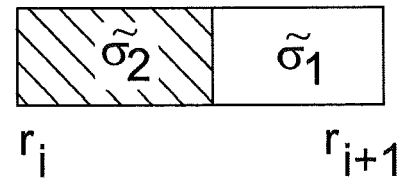

The classical method is now analyzed. To analyze this approach, let us compare two cases, see FIG. 4A and FIG. 4B. They differ from each other by swapping the zones in the radial direction only. Obviously, the tensor of the classical method is almost the same in the both cases (some minor difference is caused by cylindrical geometry only, in the Cartesian case it would be exactly the same). Sometimes it is adequate, but let us imagine that:
1) some galvanic tool is simulated;
2) the first zone is borehole filled with conductive mud;
3) the second zone is a resistive formation.

In this case, the current may gradually change its direction from almost radial to almost vertical inside this cell (when approaching the borehole wall). Obviously, the zone swapping depicted in FIG. 4 changes this pattern totally. Thus, we can suspect that any averaging method providing the same result for the both cases is not fully adequate.

Figure 5:
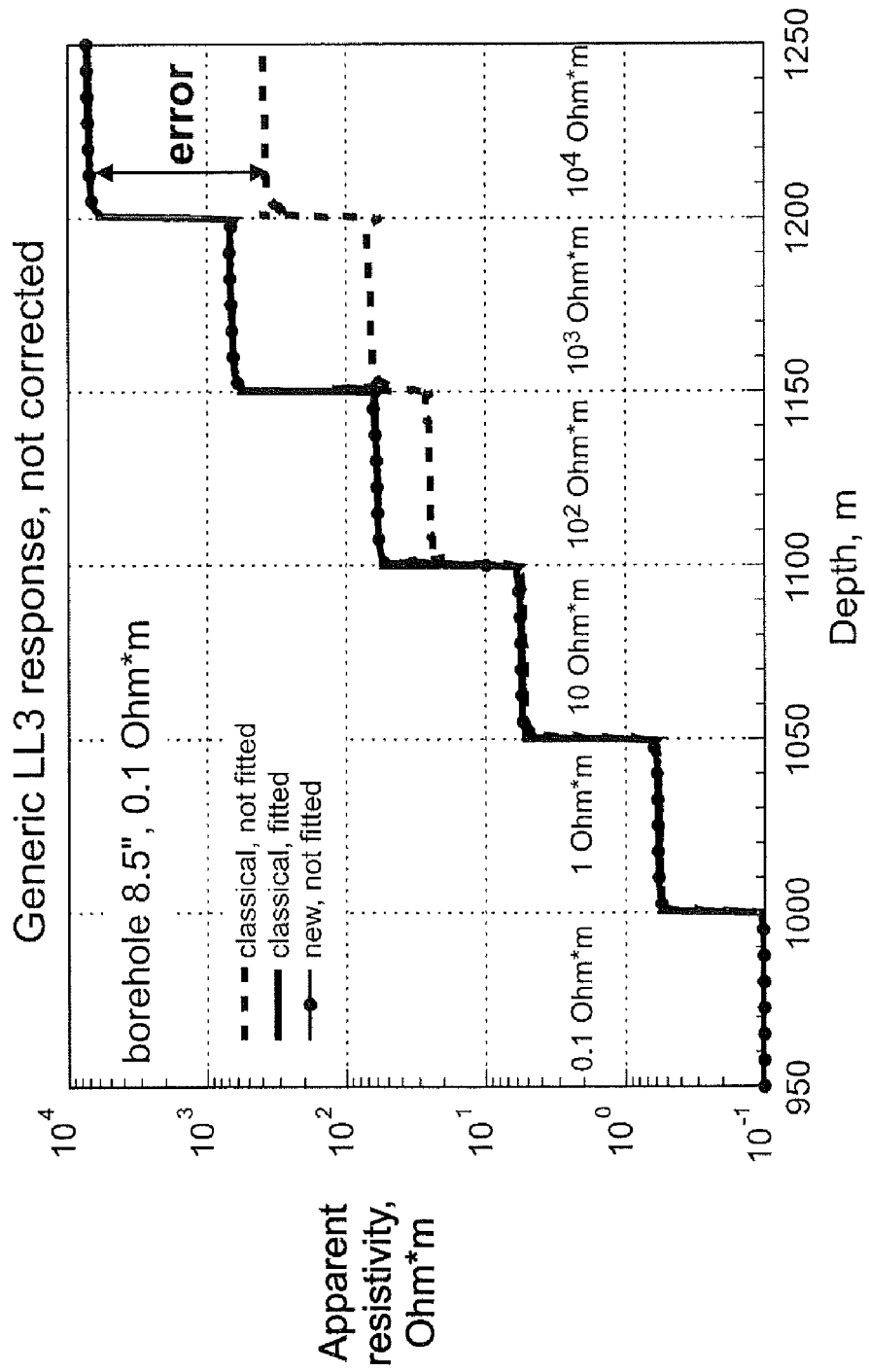
FIG. 5 illustrates results of numerical simulation for a first benchmark.

This theoretical analysis is supported by the numerical experiment presented in FIG. 5. The response of a generic DC galvanic tool LL3 was simulated for the benchmark:
borehole 8.5", mud resistivity 0.1 Ohmm;
formation with resistivity of layers 0.1; 1; 10; $10^2$; $10^3$; $10^4$ Ohmm;
each layer is of thickness 50 m except for the first and the last ones, which are infinite.

The geometrically stretching radial grid had 22 steps; the borehole radius 0.10795 m was not a node of the original grid (5), lying in between $r_3 = 0.07$ m and $r_4 = 0.15$ m. Two logs are compared: for this non-fitted grid with averaging (8) (the dashed line in FIG. 5), and for the fitted grid where the borehole radius is added to the grid as a node (the solid line in FIG. 5). It is important to note that the fitted curve changed insignificantly with grid refinement—i.e., it is a good approximation of the exact solution.

It is seen that these logs are truly close to each other for the formation-mud contrast not exceeding 100, but for its greater values the classical averaging produces huge error.

Now, a new approach for the considered problem is presented. Unlike in the classical one, no equivalent tensor is built; instead, the radial dependence of the basic functions is changed, from (6) to the form conformal with varying coefficients in a heterogeneous cell. The algorithm for this is the following one: for each horizontal layer and for each radial step $(r_i, r_{i+1})$:
1) an auxiliary local grid is constructed—fitted to all boundaries:

$$r_i = r_{i,0} < r_{i,1} < \ldots < r_{i,n-1} < r_{i,n} = r_{i+1}; \quad (9)$$

2) a problem operator is discretized on the auxiliary grid by the finite-element method (4)-(6)—denote $A_{i+1/2}^h$ the resulting discrete operator;
3) the 1D functions $V_i(r)$ and $V_{i+1}(r)$ are calculated being defined at this step as:

$$A_{i+1/2}^h V_i(r) = 0, V_i(r_i) = 1, V_i(r_{i+1}) = 0;$$

$$A_{i+1/2}^h V_{i+1}(r) = 0, V_{i+1}(r_i) = 0, V_{i+1}(r_{i+1}) = 1;$$

4) on the main grid (5), the following basic functions are used instead of (6):

$$F_{i,j}^\phi = V_i(r) L_j(z) \quad (10)$$

where functions $V_i(r)$ have been constructed in stage 3.

Some remarks are presented concerning the new approach: The calculation of $V_i(r)$ is computationally cheap being just solving a set of 1D tridiagonal problems.

Functions $V_i(r)$ are in general complex-valued (for nonzero frequencies).

Figure 6:
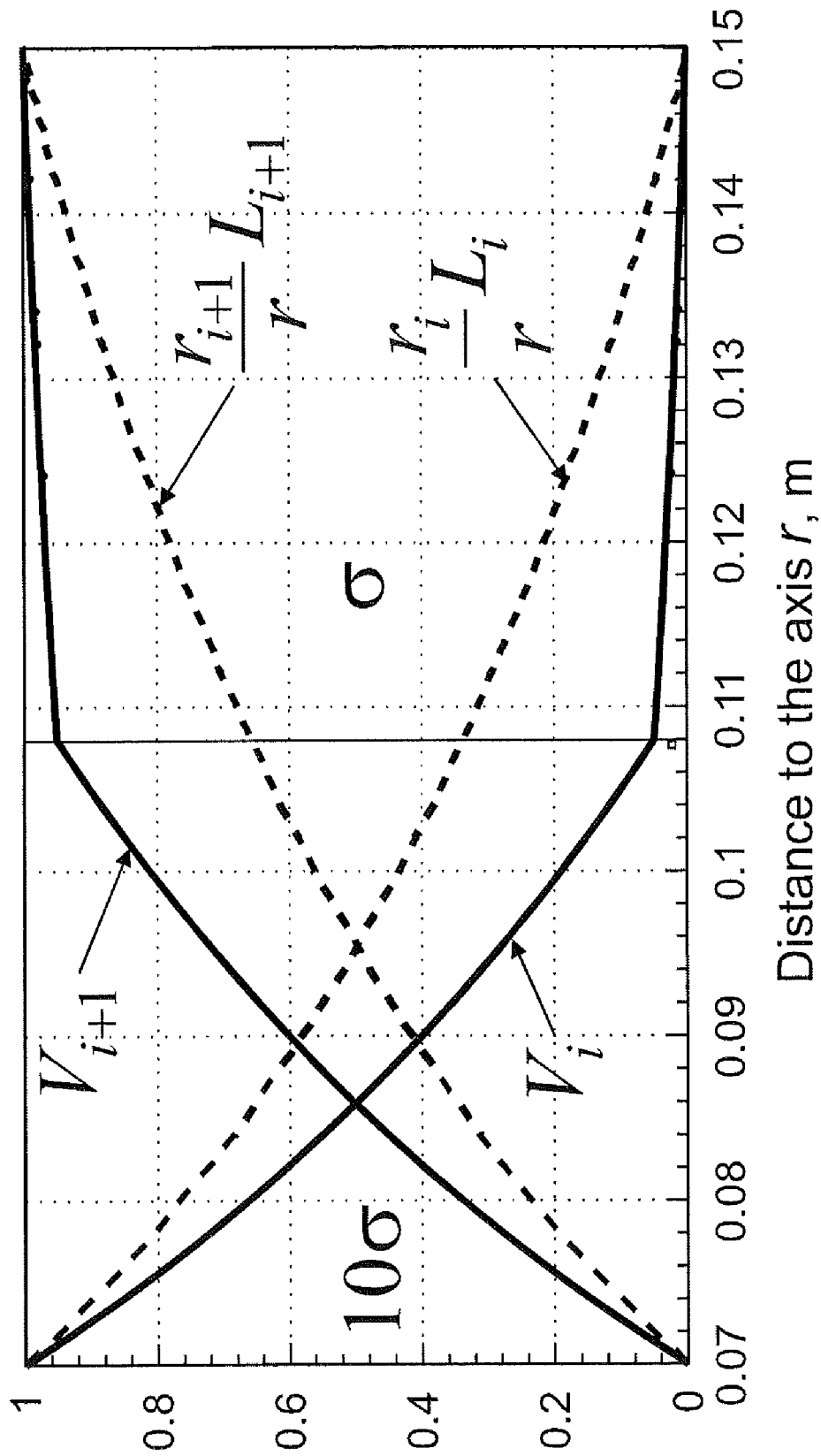
FIG. 6 illustrates old and new basic functions used for simulating conductivity.

The new functions (solid lines) are illustrated by FIG. 6, in comparison with the old ones (dashed lines), in a heterogeneous cell with the contrast 10 for zero frequency.

The result of application of the new approach to the benchmark from the previous Section is presented in the same FIG. 5 (the line with circles). We see that it coincides very well with the log on the fitted grid, up to the highest value of the contrast.

The new approach can simultaneously solve another important problem—correct resolution of the skin effect. It may so happen that the skin depth $$\delta = \sqrt{\frac{2}{\omega\mu\sigma}} \quad \text{(neglecting dielectric effects)}$$

in some problem zones (usually in metals) is significantly smaller than stepsizes of the main grid (5), but not so small that this zone could be considered as a perfect conductor. In this case, the conventional discretization (4)-(6) becomes imprecise. The situation can be remedied by corresponding grid refinement, to make the stepsizes to be comparable with the skin depth; but it can lead to significant increase of the computational expenses (see again estimate (7)).

Let us now apply the new approach in such a way that the auxiliary radial grid (9) satisfies the additional condition:

$$r_{i,j} - r_{i,j-1} \approx \delta/2.$$

As to the vertical grid—there is no problem to make it very fine due to the logarithmic dependence of the expenses on $n_z$ in (7).

Figure 7A:
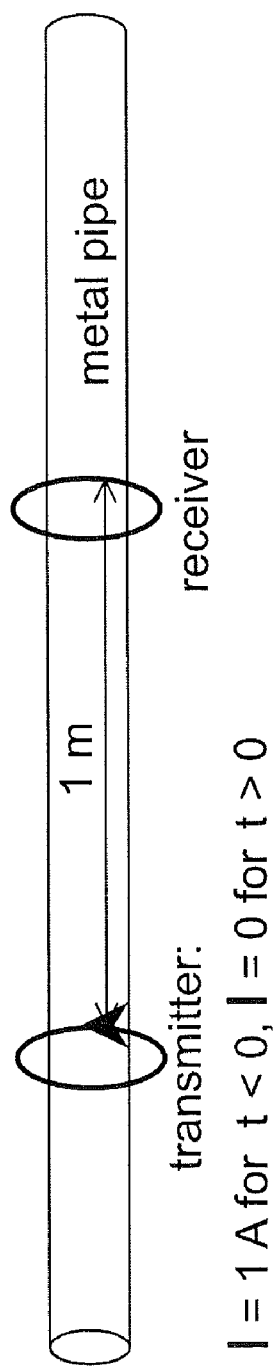
FIGS. 7A and 7B, collectively referred to as FIG. 7, depict aspects of numerical simulation for a second benchmark.

The approach was tested on the following benchmark time-domain problem (see FIG. 7A):
infinite metal pipe of radius 7 cm, conductivity $1.4 \cdot 10^6$ S/m, and formation 0.001 S/m outside it;
two identical coils of radius 9 cm around the pipe, transmitter and receiver, spaced apart of each other at 1 m;
the constant current 1 A at the transmitter is switched off at the moment t=0;

the signal is the induced electromotive force at the receiver versus time for t>0.

The problem is solved by the Fourier transformation from the frequency domain. Adequate resolution of the skin layer in the pipe is very important because it is the main source of the signal.

Figure 7B:
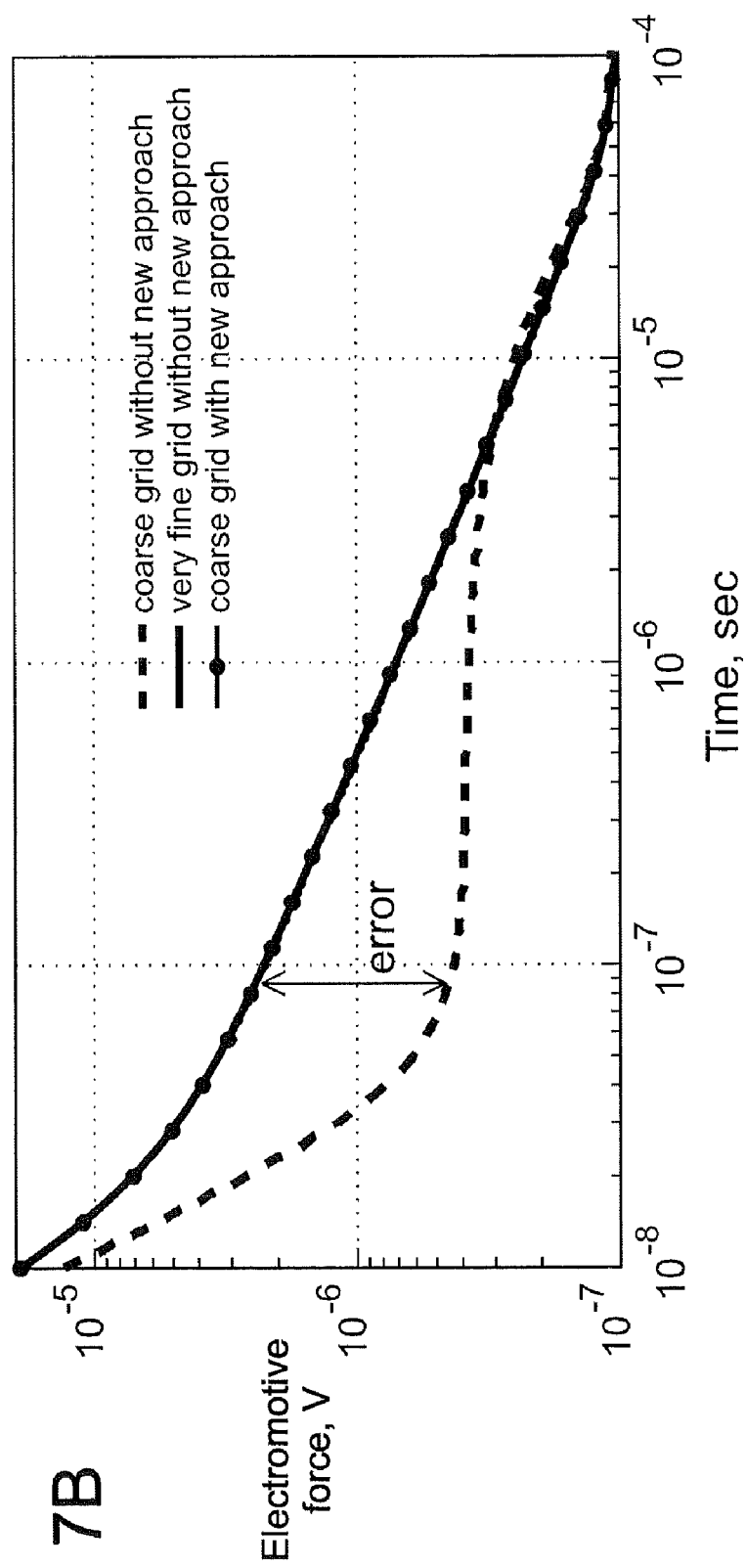

The simulation results are presented in FIG. 7B, three curves are compared:
- for a coarse grid with $n_r$=42, no application of the new approach (the dashed line);
- for a very fine grid with $n_r$=260, no application of the new approach (the solid line); and
- for a coarse grid with $n_r$=42, the new approach is applied (the line with circles).

In all cases, the pipe boundary was fitted by the grid.

We see that, while the first curve is heavily erroneous, the third one practically coincides with the precise solution #2. Moreover, the calculation of the third curve was about 200 times faster than of the second one.

It has been demonstrated that the classical "parallel-serial" way of material averaging is not adequate in some cases. The method newly proposed for 2D simulation provides much better precision. Also, it enables accurate resolution of thin skin layers on coarse grids.

Figure 8:
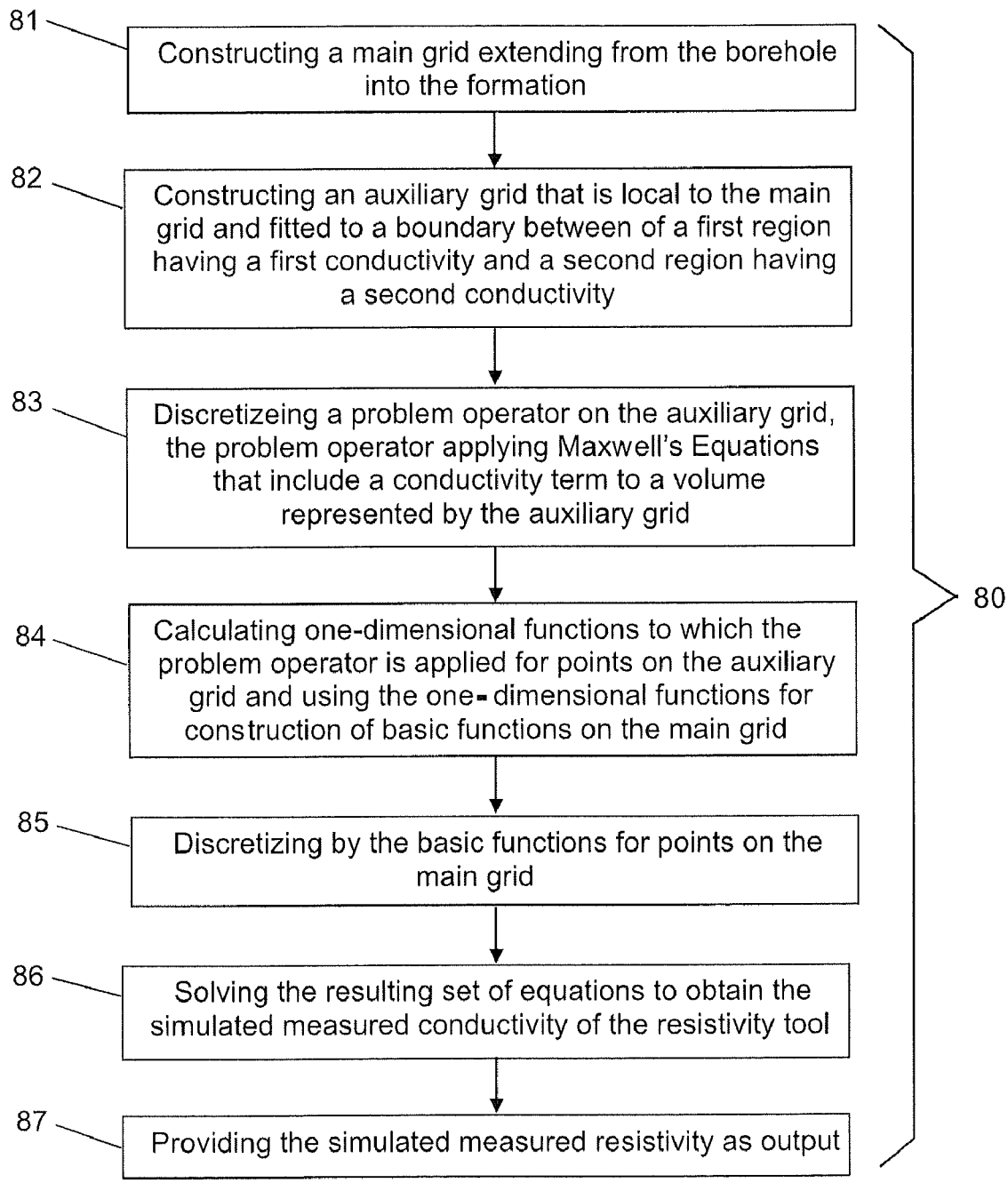
FIG. 8 presents one example of a method for simulating resistivity measurements performed by the instrument.

FIG. 8 presents one example of a method 80 for simulating a conductivity measured by a resistivity tool 20 disposed in the borehole 11 that penetrates the formation 10. The method 80 calls for (step 81) constructing a main grid extending form the borehole 11 into the formation 10. Further, the method 80 calls for (step 82) constructing an auxiliary grid that is local to the main grid and fitted to a boundary between of a first region having a first conductivity and a second region having a second conductivity. Further, the method 80 calls for (step 83) discretizing a problem operator on the auxiliary grid wherein the problem operator applies Maxwell's Equations to a volume represented by the auxiliary grid and the Maxwell's Equations include a term representing the conductivity of a material in the volume. Further, the method 80 calls for (step 84) calculating one-dimensional functions to which the problem operator is applied for points on the auxiliary grid and using the one-dimensional functions for construction of basic functions on the main grid. Further, the method 80 calls for (step 85) discretizing by the basic functions for points on the main grid. Further, the method 80 calls for (step 86) solving the resulting set of equations to obtain the simulated measured conductivity for the resistivity tool 20. Further, the method 80 calls for (step 87) providing the simulated measured conductivity as output. The output can include at least one of a printout, data on machine-readable media, and a signal containing the output.

In support of the teachings herein, various analysis components may be used to implement the method of the new approach, including a digital and/or an analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), vacuum supply, pressure supply, cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for simulating a conductivity measured by a resistivity tool disposed in a borehole penetrating an earth formation, the method comprising:

constructing with a microprocessor a main grid extending from the borehole into the formation;

constructing with the microprocessor an auxiliary grid that is local to the main grid and fitted to a boundary between a first region having a first conductivity and a second region having a second conductivity;

discretizing with the microprocessor a problem operator denoted as $A_{i+1/2}^h$ on the auxiliary grid wherein the problem operator applies Maxwell's Equations to a volume represented by the auxiliary grid and the Maxwell's Equations include a term representing the conductivity of a material in the volume;

calculating with the microprocessor one-dimensional functions $V_i(r)$ and $V_{i+1}(r)$ for points r on the auxiliary grid such that $A_{i+1/2}^h V_i(r)=0$, $V_i(r_i)=1$, $V_i(r_{i+1})=0$;

$A_{i+1/2}^h V_{i+1}(r)=0$, $V_{i+1}(r_i)=0$, $V_{i+1}(r_{i+1})=1$;

discretizing with the microprocessor by basic functions $F_{i,j}^\Phi = V_i(r)L_j(z)$ for points r and z on the main grid, where $L_j(z)$ is a one dimensional continuous and piecewise linear function such that $L_j(z)=1$ at a grid node $z_j$ and $L_j(z)=0$ at all other grid nodes;

solving with the microprocessor the resulting set of equations to obtain the simulated measured conductivity for the resistivity tool; and providing the simulated measured conductivity as output from the microprocessor.

2. The method of claim 1, wherein coordinates (r,z) are cylindrical coordinates measured from an axis in a center of the borehole.

3. The method of claim 2, wherein the main grid is described as:

$(r_i, z_j), i=0, 1, \ldots, n_r, j=1, \ldots, n_z; r_0=0.$

4. The method of claim 3, wherein the auxiliary grid is described as:

$r_i = r_{i,0} < r_{i,1} < \ldots < r_{i,n-1} < r_{i,n} = r_{i+1}.$

5. The method of claim 4, further comprising resolving a skin effect by satisfying the following requirement for generating the auxilliary grid:

$r_{i,j} - r_{i,j-1} \approx \delta/2$ where $$\delta = \sqrt{\frac{2}{\omega \mu \sigma}}$$

ω represents angular frequency;
μ represents a magnetic permeability tensor; and
σ represents conductivity.

6. The method of claim 1, wherein the Maxwell's Equations have a form comprising as least one of:

$\nabla \times ((i\omega\mu)^{-1} \nabla \times E) - \tilde{\sigma} E = J^{out}$ and $\nabla \times (\tilde{\sigma}^{-1} \nabla \times H) - i\omega\mu E = \nabla \times (\tilde{\sigma}^{-1} J^{out}),$ where: E represents a complex valued electric field;
H represents a complex valued magnetic field;
ω represents angular frequency;
$\tilde{\sigma} = \sigma - i\omega\epsilon$ represents a generalized conductivity tensor;
ε represents a permittivity tensor;
μ represents a magnetic permeability tensor; and
$J^{out}$ represents an exciting electrical current.

7. The method of claim 6, further comprising:
transforming the Maxwell's Equations into an integral form by multiplying both sides on an arbitrary vector function F;
integrating the integral form over the whole three-dimensional space; and
applying Green's formula.

8. The method of claim 7, wherein the resulting equations comprise at least one of:

$$\int_{R^3} ((i\omega\mu)^{-1} \nabla \times E \cdot \nabla \times F - \tilde{\sigma} E \cdot F) d\Omega = \int_{R^3} J^{out} \cdot F d\Omega \quad (1)$$

and $$\int_{R^3} (\tilde{\sigma}^{-1} \nabla \times H \cdot \nabla \times F - i\omega\mu H \cdot F) d\Omega = \quad (2)$$

$$\int_{R^3} \tilde{\sigma}^{-1} J^{out} \cdot \nabla \times F d\Omega \text{ for any } F.$$

9. The method of claim 8, wherein discretizing a problem operator comprises searching for an approximate solution $E^h$ of equation (1) such that $$E^h = \sum_{i=1}^{N} u_i F_i^h \text{ where } F_i^h \text{ are some basic functions} \quad (3)$$

10. The method of claim 9, further comprising substituting equation (3) into equation (1) and requiring the equality to be satisfied for the basic functions $F_i^h$, i=1, . . . , N.

11. The method of claim 10, further comprising obtaining a system of linear equations for the coefficients $u_i$ from the substituting, the system of linear equations comprising:

$$Au = f, \text{ where } u = (u_1, \ldots, u_N),$$

$$f = (f_1, \ldots, f_N), A = \{a_{ij}\},$$

$$a_{ij} = \int_{R^3} ((i\omega\mu)^{-1} \nabla \times F_i^h \cdot \nabla \times F_j^h - \tilde{\sigma} F_i^h \cdot F_j^h) d\Omega,$$

$$f_i = \int_{R^3} J^{out} \cdot F_i^h d\Omega.$$

12. The method of claim 1, further comprising simulating determining the boundary from the solving.

13. The method of claim 1, wherein the resistivity tool is at least one of a galvanic tool and an induction tool.

14. A method for estimating a property of an earth formation penetrated by a borehole, the method comprising:
conveying a logging tool in the borehole;
performing resistivity measurements with the logging tool;
simulating resistivity measurements performed by the logging tool by implementing the following steps:
constructing a main grid extending from the borehole into the formation;
constructing an auxiliary grid that is local to the main grid and fitted to a boundary between a first region having a first conductivity and a second region having a second conductivity;
discretizing a problem operator denoted as $A_{i+1/2}^h$ on the auxiliary grid wherein the problem operator applies Maxwell's Equations to a volume represented by the auxiliary grid and the Maxwell's Equations include a term representing the conductivity of a material in the volume;
calculating one-dimensional functions $V_i(r)$ and $V_{i+1}(r)$ for points r on the auxiliary grid such that $A_{i+1/2}^h V_i(r)=0, V_i(r_i)=1, V_i(r_{i+1})=0;$ $A_{i+1/2}^h V_{i+1}(r)=0, V_{i+1}(r_i)=0, V_{i+1}(r_{i+1})=1;$ discretizing by basic functions $F_{i,j}^\Phi = V_i(r) L_j(z)$ for points r and z on the main grid, where $L_j(z)$ is a one dimensional continuous and piecewise linear function such that $L_j(z)=1$ at a grid node $z_j$ and $L_j(z)=0$ at all other grid nodes; and
solving the resulting set of equations to obtain the simulated measured conductivity for the resistivity tool;
comparing the resistivity measurements to the simulated measurements; and estimating the property from the comparing.

15. The method of claim 14, wherein the property comprises conductivity.

16. The method of claim 15, wherein the property comprises the boundary.

17. The method of claim 14, wherein the resistivity tool is conveyed by at least one of a wireline, a drill string, a slickline, and coiled tubing.

18. A non-transitory machine-readable medium comprising machine-executable instructions for simulating a conductivity measured by a resistivity tool disposed in a borehole penetrating an earth formation, the instructions comprising the following steps:

constructing a main grid extending from the borehole into the formation;

constructing an auxiliary grid that is local to the main grid and fitted to a boundary between a first region having a first conductivity and a second region having a second conductivity;

discretizing a problem operator denoted as $A_{i+1/2}^h$ on the auxiliary grid wherein the problem operator applies Maxwell's Equations to a volume represented by the auxiliary grid and the Maxwell's Equations include a term representing the conductivity of a material in the volume;

calculating one-dimensional functions $V_i(r)$ and $V_{i+1}(r)$ for points r on the auxiliary grid such that $$A_{i+1/2}^h V_i(r)=0, V_i(r_i)=1, V_i(r_{i+1})=0;$$

$$A_{i+1/2}^h V_{i+1}(r)=0, V_{i+1}(r_i)=0, V_{i+1}(r_{i+1})=1;$$

discretizing by basic functions $F_{i,j}^\Phi = V_i(r)L_j(z)$ for points r and z on the main grid, where $L_j(z)$ is a one dimensional continuous and piecewise linear function such that $L_j(z)=1$ at a grid node $z_j$ and $L_j(z)=0$ at all other grid nodes; and solving the resulting set of equations to obtain the simulated measured conductivity for the resistivity tool.

* * * * *